(12) United States Patent
Tamiya

(10) Patent No.: US 8,363,230 B2
(45) Date of Patent: Jan. 29, 2013

(54) DISPLACEMENT DETECTING DEVICE

(75) Inventor: Hideaki Tamiya, Kanagawa (JP)

(73) Assignee: Mori Seiki Co., Ltd. (JP)

(*) Notice: Subject to any disclaimer, the term of this patent is extended or adjusted under 35 U.S.C. 154(b) by 36 days.

(21) Appl. No.: 13/163,824

(22) Filed: Jun. 20, 2011

(65) Prior Publication Data

US 2011/0317172 A1  Dec. 29, 2011

(30) Foreign Application Priority Data

Jun. 23, 2010 (JP) ................................ 2010-142291

(51) Int. Cl.
 *G01B 11/14* (2006.01)
(52) U.S. Cl. ... 356/614; 356/450; 356/482; 250/231.17; 250/559.29
(58) Field of Classification Search .......... 356/614–625, 356/450, 482, 486; 250/231.17, 237 G, 201.2, 250/559.29, 216, 221
See application file for complete search history.

(56) References Cited

U.S. PATENT DOCUMENTS

| | | | | |
|---|---|---|---|---|
| 5,059,791 A | * | 10/1991 | Ishizuka et al. | 250/231.17 |
| 5,074,667 A | * | 12/1991 | Miyatake | 356/401 |
| 5,737,069 A | * | 4/1998 | Nashiki et al. | 356/5.13 |
| 2006/0279747 A1 | * | 12/2006 | Tamiya | 356/616 |
| 2008/0047335 A1 | * | 2/2008 | Kawasaki et al. | 73/105 |
| 2009/0261233 A1 | * | 10/2009 | Tamiya et al. | 250/201.2 |
| 2011/0310400 A1 | * | 12/2011 | Oguri | 356/614 |

FOREIGN PATENT DOCUMENTS

JP   5-89480 A   4/1993

* cited by examiner

*Primary Examiner* — Sang Nguyen
(74) *Attorney, Agent, or Firm* — Cantor Colburn LLP

(57) ABSTRACT

A displacement detecting device comprises: a light source, a first beam splitter adapted to split the light emitted from the light source into a first beam and a second beam, a reflecting member adapted to reflect the first beam, an objective lens adapted to condense the second beam on a surface-to-be-measured, a first light receiving section adapted to receive interference light of the reflected first beam and the reflected second beam, a relative position information output section adapted to output relative position information in height direction of the surface-to-be-measured, a second beam splitter adapted to extract a part of the reflected second beam, an astigmatism generator adapted to generate astigmatism in the extracted second beam, a second light receiving section adapted to receive the second beam having astigmatism, and an absolute position information output section adapted to generate absolute position information in height direction of the surface-to-be-measured.

2 Claims, 5 Drawing Sheets

300

DISPLACEMENT DETECTING DEVICE

CROSS REFERENCES TO RELATED APPLICATIONS

The present invention contains subject matter related to Japanese Patent Application JP 2010-142291 filed in the Japanese Patent Office on Jun. 23, 2010, the entire contents of which being incorporated herein by reference.

BACKGROUND OF THE INVENTION

1. Field of the Invention

The present invention relates to a displacement detecting device for accurately detecting displacement of a surface-to-be-measured by a non-contact sensor which uses light.

2. Description of the Related Art

Conventionally, displacement detecting devices are widely used for measuring displacement and shape of a surface-to-be-measured.

Among these displacement detecting devices, there is a displacement detecting device that detects the displacement of the surface-to-be-measured in a non-contact manner by using light. In such displacement detecting device, for example, the light emitted from a light source is condensed on the surface-to-be-measured by an objective lens. Further, the light reflected by the surface-to-be-measured is condensed by an astigmatic optical element so that astigmatism is generated therein, and the light having the astigmatism generated therein is incident on a light receiving element.

Based on the intensity of the light received by the light receiving element, a focus error signal is generated by an astigmatism method, and a servo is operated to displace the objective lens so that the focus position of the condensed light is located on the surface-to-be-measured.

Further, a linear scale is integrally attached to the objective lens through a connecting member, so that the linear scale also moves due to being interlocked with the displacement of the objective lens. The scale of the moving linear scale is read by a detection head fixed to a fixed point, and thereby the displacement in the height direction of the surface-to-be-measured is detected.

However, in such displacement detecting device, since linearity of the focus error signal itself is bad, high detection accuracy can not be obtained.

To solve this problem, a method for correcting the focus error signal of the non-contact sensor by using a correction table is proposed in Japanese Unexamined Patent Application Publication No. H05-89480.

In the displacement detecting device disclosed in Japanese Unexamined Patent Application Publication No. H05-89480, in order to improve the accuracy of the displacement detection, NA (Numerical Aperture) of the objective lens is set large, and therefore the beam diameter condensed on the surface-to-be-measured reduced. For example, when the beam diameter formed on the surface-to-be-measured is about 2 μm, the detection accuracy of the linear scale will be in a range between several nm and several hundreds nm.

SUMMARY OF THE INVENTION

However, in the displacement detecting device disclosed in Japanese Unexamined Patent Application Publication No. H05-89480, high resolution is achieved by reducing the beam diameter of the light imaged on surface-to-be-measured. Thus, the reflected light from the surface-to-be-measured is susceptible to the influence of the surface roughness, so that the light imaged on surface-to-be-measured is scattered to therefore cause measurement error.

Further, since high resolution is achieved by reducing the beam diameter, there are cases where fine foreign matter and/or the like attached on the surface-to-be-measured is detected, so that displacement information such as the displacement, shape and the like of the surface-to-be-measured can not always be accurately obtained.

Further, an ultra-precise positioning stage having a tilt mechanism is used in current semiconductor manufacturing equipment, inspection equipment and the like. In such an ultra-precise positioning stage, it is required to perform measurement in height direction at high speed while suppressing the heat generated by the sensor itself.

However, in previous displacement detecting devices such as the displacement detecting device disclosed in Japanese Unexamined Patent Application Publication No. H05-89480, it is necessary to perform control so that the image of the beam is always located on the surface-to-be-measured.

Thus, in the art disclosed in Japanese Unexamined Patent Application Publication No. H05-89480, the objective lens is moved up and down in optical axis direction thereof driven by, for example, a drive mechanism such as an actuator which uses a magnet and a coil; however, due to the structure and mass of the actuator, there is a limitation in mechanical response frequency of the up-down movement of the objective lens.

Further, since the coil and the like are actuated, the objective lens will be heated, and therefore the measurement position will be drifted.

Due to the aforesaid reasons, in the conventional methods, service conditions are limited.

In view of the aforesaid problems, it is an object of the present invention to provide a displacement detecting device having wider service conditions and capable of accurately detecting position in the height direction.

To solve the aforesaid problems, a displacement detecting device according to an aspect of the present invention includes a light source, a first beam splitter adapted to split the light emitted from the light source into a first beam and a second beam, and a reflecting member adapted to reflect the first beam split by the first beam splitter.

The aforesaid displacement detecting device further includes an objective lens adapted to condense the second beam split by the first beam splitter on a surface-to-be-measured, and a first light receiving section adapted to receive interference light of the first beam reflected by the reflecting member and the second beam reflected by the surface-to-be-measured.

The aforesaid displacement detecting device further includes a relative position information output section adapted to output relative position information in the height direction of the surface-to-be-measured based on the intensity of the interference light received by the first light receiving section.

The aforesaid displacement detecting device further includes a second beam splitter adapted to extract a part of the second beam reflected by the surface-to-be-measured, and an astigmatism generator adapted to generate astigmatism in the second beam extracted by the second beam splitter.

The aforesaid displacement detecting device further includes a second light receiving section adapted to receive the second beam having the astigmatism generated therein by the astigmatism generator, and an absolute position information output section adapted to generate absolute position information in the height direction of the surface-to-be-measured based on the intensity of the received light detected by the second light receiving section, and output generated absolute position information.

With the displacement detecting device according to the present invention, the relative position information is obtained based on the interference light of the reflected light from the surface-to-be-measured and the reflected light from the reflecting member. In other words, the intensity of the interference light which periodically changes according to the height of the surface-to-be-measured is used as a scale.

Further, with the displacement detecting device according to the present invention, the absolute position information is outputted based on the reflected light from the surface-to-be-measured. Thus, the reference point and reference position of the aforesaid scale formed by the interference light can be determined based on the absolute position information, so that the displacement of the surface-to-be-measured can be correctly detected.

With the displacement detecting device according to the present invention, the relative position information is obtained based on the interference light of the reflected light from the surface-to-be-measured and the reflected light from the reflecting member, and the absolute position information is obtained based on the reflected light from the surface-to-be-measured.

Thus, the displacement can be detected without employing a conventional microfabricated scale. Further, it is also not necessary to drive the scale in interlock with the objective lens like in the conventional art.

Since the conventional drive mechanism is not necessary, the heat generated during use can be reduced. Further, since the drive mechanism is not necessary, there will be no problem of response frequency, and therefore service conditions can be eased.

DETAILED DESCRIPTION OF THE PREFERRED EMBODIMENTS

A displacement detecting device according to preferred embodiments of the present invention will be described below with reference to FIGS. 1 to 6. However, it should be noted that the present invention is not limited to these embodiments.

Further, the various lenses described below may each be a single lens or a lens group.

Further, in the present invention, irrespective of embodiments, when a semiconductor laser of single mode is used as the light source, since a beam of light with high coherence can be emitted, measuring range can be expanded. In such a case, it is preferred that the temperature of the light source is controlled to stabilize the wavelength of the emitted light.

Further, when a semiconductor laser of multi-mode is used as the light source, since coherence of the light emitted from semiconductor laser of multi-mode is lower than that of the light emitted from the semiconductor laser of single mode, the speckle on the light receiving surface of the light receiving element will be suppressed. However, in such a case, the measuring range becomes the coherence length.

Further, it is preferred that the light source is detachably attached to the main body of the displacement detecting device. With such an arrangement, it becomes easy to change the light source when the light source is out of its service life or when the wavelength of the light source needs to be changed.

Further, the light source may be an external light source that supplies light through an optical fiber or the like. In such a case, the light source, which is a heat source, can be moved to the outside. Further, by detachably attaching the light source to the optical fiber, the light source can be maintained in a place separated from the displacement detecting device, so that workability can be improved.

Further, the light of the light source may also be supplied from the outside through a gas space, a liquid space, a vacuum space or the like. In such a case, not only the heat source can be arranged separately from the main body of the device, but also the member connected to the main body of the device, such as the optical fiber and/or the like, can be eliminated, so that no vibration is transmitted to the main body of the device.

Further, in order to reduce the influence of the wavelength fluctuation of the light source caused by temperature fluctuation, it is preferred that an achromatic lens, for example, is used as the objective lens to correct chromatic aberration.

1. First Embodiment

Figure 1:
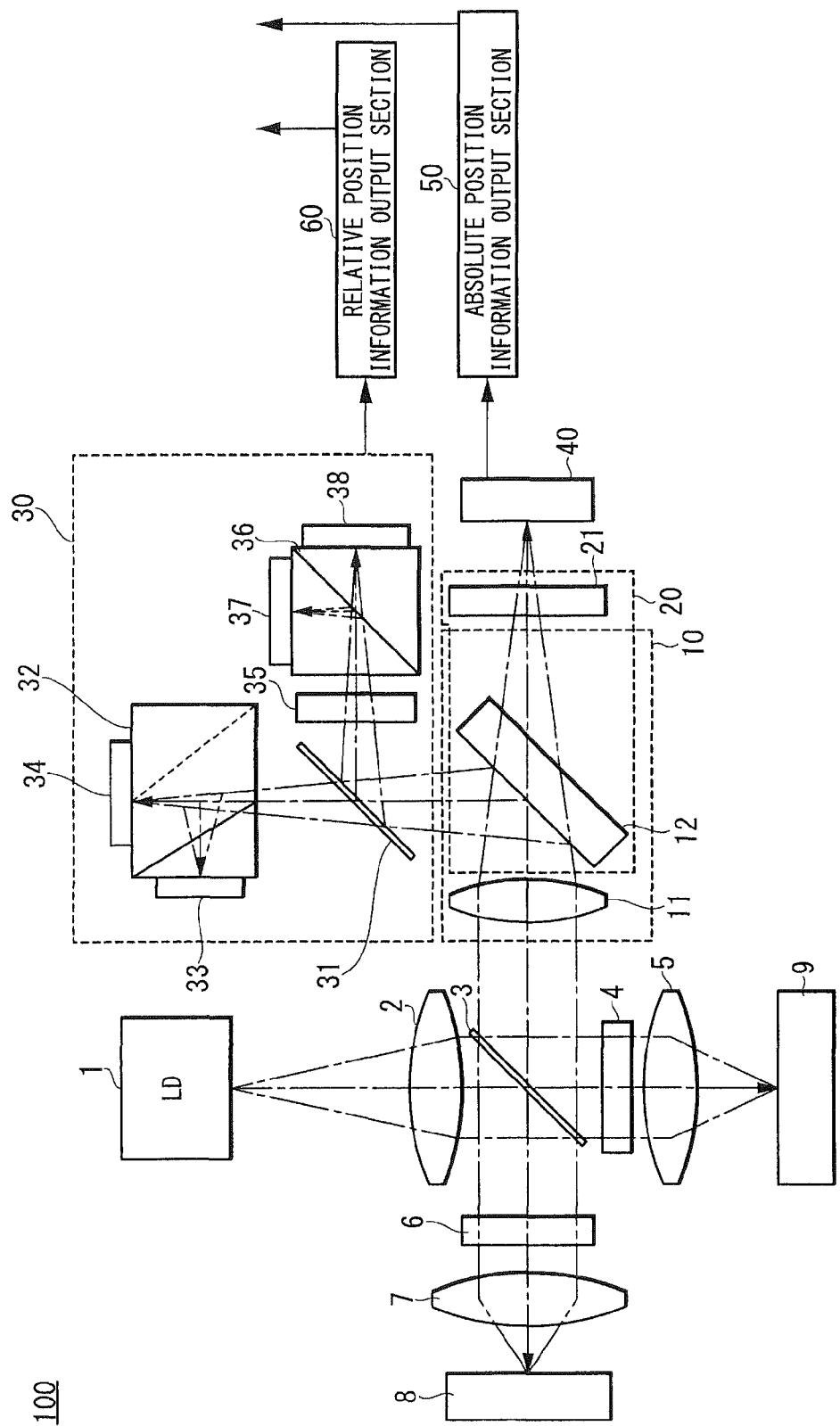
FIG. 1 is a view schematically showing the configuration of a displacement detecting device according to a first embodiment of the present invention.

FIG. 1 is a view schematically showing the configuration of a displacement detecting device 100 according to a first embodiment of the present invention. The displacement detecting device 100 according to the present embodiment includes a light source 1, a first beam splitter 3 adapted to split the light emitted from the light source 1 into a first beam and a second beam, and a reflecting member 8 adapted to reflect the first beam split by the first beam splitter 3.

The displacement detecting device 100 further includes an objective lens 5 adapted to condense the second beam split by the first beam splitter 3 on a surface-to-be-measured of an object-to-be-measured 9, and a first light receiving section 30 adapted to receive interference light of the first beam reflected by the reflecting member 8 and the second beam reflected by the surface-to-be-measured of the object-to-be-measured 9.

The displacement detecting device 100 further includes a relative position information output section 60 adapted to output the displacement of the surface-to-be-measured of the object-to-be-measured 9 in the height direction based on the intensity of the interference light received by the first light receiving section 30.

The displacement detecting device 100 further includes a second beam splitter 20 adapted to extract a part of the second beam reflected by the surface-to-be-measured, and an astigmatism generator 10 adapted to generate astigmatism in the second beam extracted by the second beam splitter 20.

The displacement detecting device 100 further includes a second light receiving section 40 adapted to receive the second beam having the astigmatism generated therein by the astigmatism generator 10, and an absolute position information output section 50 adapted to generate absolute position information of the surface-to-be-measured in the height direction based on the intensity of the received light detected by the second light receiving section 40 and output the absolute position information.

The light source 1 may be configured by, for example, a semiconductor laser diode, a super luminescent diode, a luminescent diode or the like. Incidentally, as described later, in the present invention, since interference light of the light from the light source is used to perform measurement, the greater the coherence length of the light from the light source is, the wider the measuring range is.

The light emitted from the light source 1 is collimated into, for example, parallel light by a lens 2 such as a collimator lens or the like. Further, the light collimated by the lens 2 is split into two beams by the first beam splitter (such as a polarizing beam splitter or the like) 3.

For example, in the light from the light source 1, s-polarized light is reflected by the first beam splitter 3, and p-polarized light is transmitted through the first beam splitter 3.

The first beam, which is composed of the s-polarized light, reflected by the first beam splitter 3 is condensed on the reflecting member (such as a mirror or the like or the like) 8 by a condensing lens 7. The light-reflecting film of the reflecting member 8 is made of a metal such as gold or the like. Thus, compared to a general reflecting film made of dielectric multilayer, change in wavelength and property of the polarized light caused by the change in humidity can be suppressed, so that it is possible to perform position detection with stability.

The first beam reflected by the reflecting member 8 is incident on the first beam splitter 3 again through the condensing lens 7. Incidentally, a phase plate (such as a quarter-wave plate or the like) 6 is arranged in the optical path between the first beam splitter 3 and the reflecting member 8. Thus, while the first beam goes toward the reflecting member 8 and returns from the reflecting member 8, the first beam is transmitted through the phase plate 6 twice and thereby the polarization direction thereof is rotated by 90 degrees, so that the first beam is converted to p-polarized light.

Further, the first beam, which has been converted to the p-polarized light, is transmitted through the first beam splitter 3 and incident on a condensing lens 11.

On the other hand, the second beam, which is composed of the p-polarized light, transmitted through the first beam splitter 3 is transmitted through a phase plate (such as a quarter-wave plate or the like) 4 and thereby becomes circularly polarized light, and such circularly polarized light is condensed on the surface-to-be-measured of the object-to-be-measured 9 by the objective lens 5. The larger the NA value of the objective lens 5 is, the higher the resolution is; and the smaller the NA value of the objective lens 5 is, the wider the measuring range of the surface-to-be-measured is.

Incidentally, the second beam condensed by the objective lens 5 does not have to form an image on the surface-to-be-measured.

By shifting the image location from the surface-to-be-measured so as to increase the spot diameter on the surface-to-be-measured, the influence of the measurement error caused by the surface roughness of the surface-to-be-measured, the foreign matter attached on the surface-to-be-measured and/or the like can be reduced. Further, in the art disclosed in Japanese Unexamined Patent Application Publication No. H05-89480, the objective lens is actuated to move up and down following the surface-to-be-measured so that the light form an image on the surface-to-be-measured. In contrast, the objective lens 5 in the present embodiment is fixed in the displacement detecting device 100.

Therefore, in the present embodiment, the position where an image of the second beam is to be formed by the objective lens 5 does not change despite the unevenness of the surface-to-be-measured. Thus, the position where an image of the second beam is to be formed by the objective lens 5 can serve as a reference point for obtaining the absolute displacement of the surface-to-be-measured.

The second beam incident on the surface-to-be-measured is reflected, and incident on the phase plate (such as a quarter-wave plate or the like) 4 again through the objective lens 5. The second beam is converted from the circularly polarized light to s-polarized light by the phase plate 4, and reflected by the first beam splitter 3.

Further, the second beam reflected by the first beam splitter 3 is incident on the condensing lens 11.

Incidentally, it is preferred that the optical path length between the first beam splitter 3 and the reflecting member 8 is equal to the optical path length between the first beam splitter 3 and the focus position of the second beam condensed by the objective lens 5 (i.e., the optical path length between the first beam splitter 3 and the reference point for measuring the absolute displacement).

With such an arrangement, even there is fluctuation in wavelength of the light source caused by fluctuation in pressure, humidity and temperature, it is possible to make the influence exerted on the first beam equal to the influence exerted on the second beam. Thus, it is possible to stabilize the intensity of the interference light of the first beam and the second beam received by the first light receiving section (the details of which is to be described later), regardless of the ambient environment, so that measurement can be performed more accurately.

The first beam and the second beam transmitted through the condensing lens 11 are each split into two beams by the second beam splitter 20.

In the present embodiment, the second beam splitter 20 is configured by, for example, a beam splitter 12 and a polarizing plate 21.

The first beam and the second beam reflected by the beam splitter 12 are incident on the light receiving section 30 where the beams are received.

Further, the first beam and the second beam transmitted through the beam splitter 12 are transmitted through the polarizing plate 21, and thereby only the second beam, which is the reflected light from the object-to-be-measured 9, is received by the light receiving section 40.

The first light receiving section 30 includes a half mirror 31 and a polarizing beam splitter 32, wherein the first light receiving section 30 is adapted to split the first beam and the second beam reflected by the beam splitter 12 into two beams, and the polarizing beam splitter 32 is adapted to further split one of the two beams split by the half mirror 31 into two beams. The first light receiving section 30 further includes a first light receiving element 33 and a second light receiving element 34 to respectively receive the two beams split by the polarizing beam splitter 32.

The first light receiving section 30 further includes a phase plate (such as a quarter-wave plate or the like) 35 disposed in the optical path of the other one of the two beams split by the half mirror 31, and a polarizing beam splitter 36 adapted to split the beam transmitted through the phase plate 35 into two beams. The first light receiving section 30 further includes a third light receiving element 37 and a fourth light receiving element 38 to respectively receive the two beams split by the polarizing beam splitter 36.

The first beam and the second beam incident on the half mirror 31 are respectively split.

The first beam and the second beam transmitted through the half mirror 31 are incident on the polarizing beam splitter 32. The polarizing beam splitter 32 is obliquely disposed so that both the polarization direction of the first beam and the polarization direction of the second beam are inclined with respect to the incidence plane of the polarizing beam splitter 32 at an angle of 45 degrees, wherein the polarization direction of the first beam and the polarization direction of the second beam are different from each other by 90 degrees.

With such an arrangement, the first beam and the second beam both own the p-polarized component and the s-polarized component with respect to the polarizing beam splitter 32. Thus, the first beam and the second beam transmitted through the polarizing beam splitter 32 become, for example, p-polarized light with the same polarization direction, so that the first beam and the second beam can interfere with each other.

Similarly, the first beam and the second beam reflected by the polarizing beam splitter 32 become s-polarized light having the same polarization direction with respect to the polarizing beam splitter 32, so that the first beam and the second beam can interfere with each other.

The interference light of the first beam and the second beam reflected by the polarizing beam splitter 32 is received by the first light receiving element 33. Further, the interference light of the first beam and the second beam transmitted through the polarizing beam splitter 32 is received by the second light receiving element 34.

Further, the phase of the signal photoelectrically converted by the first light receiving element 33 and the phase of the signal photoelectrically converted by the second light receiving element 34 are different from each other by 180 degrees.

A interference signal expressed by "A cos(Kx+δ)" is obtained in the first light receiving element 33 and the second light receiving element 34. "A" represents the amplitude of the interference signal, and "K" represents the wave number which is expressed by "2π/Λ" where "Λ" represents the wavelength of the light source 1.

Further, "x" represents amount of change of the optical path length of the second beam reflected by the surface-to-be-measured of the object-to-be-measured 9, wherein the optical path length of the second beam changes depending on the shape of the surface-to-be-measured.

Since the reflecting member 8 is fixed, the optical path length of the first beam does not change. Thus, the first light receiving element 33 and the second light receiving element 34 receive the interference light in which bright and dark fringes of one cycle are generated every time the optical path length of the second beam changes by Λ/2 depending on the shape of the surface-to-be-measured.

On the other hand, the first beam and the second beam reflected by the half mirror 31 are incident on the phase plate (such as a quarter-wave plate or the like) 35. The first beam and the second beam, which are linearly polarized light beams having the polarization directions different from each other by 90 degrees, are transmitted through the phase plate 35 and thereby become two circularly polarized light beams with mutually reversed rotational directions.

Further, since the two circularly polarized light beams with mutually reversed rotational directions are located in the same optical path, they are superimposed on each other to thereby become linearly polarized light, and such linearly polarized light is incident on the polarizing beam splitter 36.

The s-polarized component of such linearly polarized light is reflected by the polarizing beam splitter 36 and received by the third light receiving element 37. Further, the p-polarized component is transmitted through the polarizing beam splitter 36 and received by the fourth light receiving element 38.

The linearly polarized light incident on the polarizing beam splitter 36 is generated by superimposing the two circularly polarized light beams with mutually reversed rotational directions on each other. Thus, if the optical path length of the second beam changes and thereby the phase of the first beam and the phase of the second beam are shifted from each other, the polarization direction of the superimposed linearly polarized light will rotate.

If the optical path length of the second beam is changed by Λ/2, the linearly polarized light will rotate by exactly 180 degrees. Thus, the third light receiving element 37 and the fourth light receiving element 38 receive the interference light in which bright and dark fringes of one cycle are generated every time the optical path length of the second beam changes by Λ/2, and the signal photoelectrically converted by the third light receiving element 37 and the fourth light receiving element 38 is expressed by "A cos(Kx+δ')". Here, "δ'" represents an initial phase.

Further, the phase of the signal photoelectrically converted by the third light receiving element 37 and the phase of the signal photoelectrically converted by the fourth light receiving element 38 are different from each other by 180 degrees.

Incidentally, the polarizing beam splitter 36, which is adapted to split the beams received by the third light receiving element 37 and fourth light receiving element 38, is disposed at 45 degrees with respect to the polarizing beam splitter 32, which is adapted to split the beams received by the first light receiving element 33 and second light receiving element 34.

Thus, the phase of the signals obtained by the third light receiving element 37 and fourth light receiving element 38 are different from the phase of the signals obtained by the first light receiving element 33 and second light receiving element 34 by 90 degrees.

Thus, it is possible to obtain a Lissajous signal by using the signals obtained by the first light receiving element 33 and second light receiving element 34 as a sine signal, and using the signals obtained by the third light receiving element 37 and fourth light receiving element 38 as a cosine signal.

The signals obtained by these light receiving elements are calculated by the relative position information output section 60, and the amount of the displacement of the surface-to-be-measured is counted.

Figure 2:
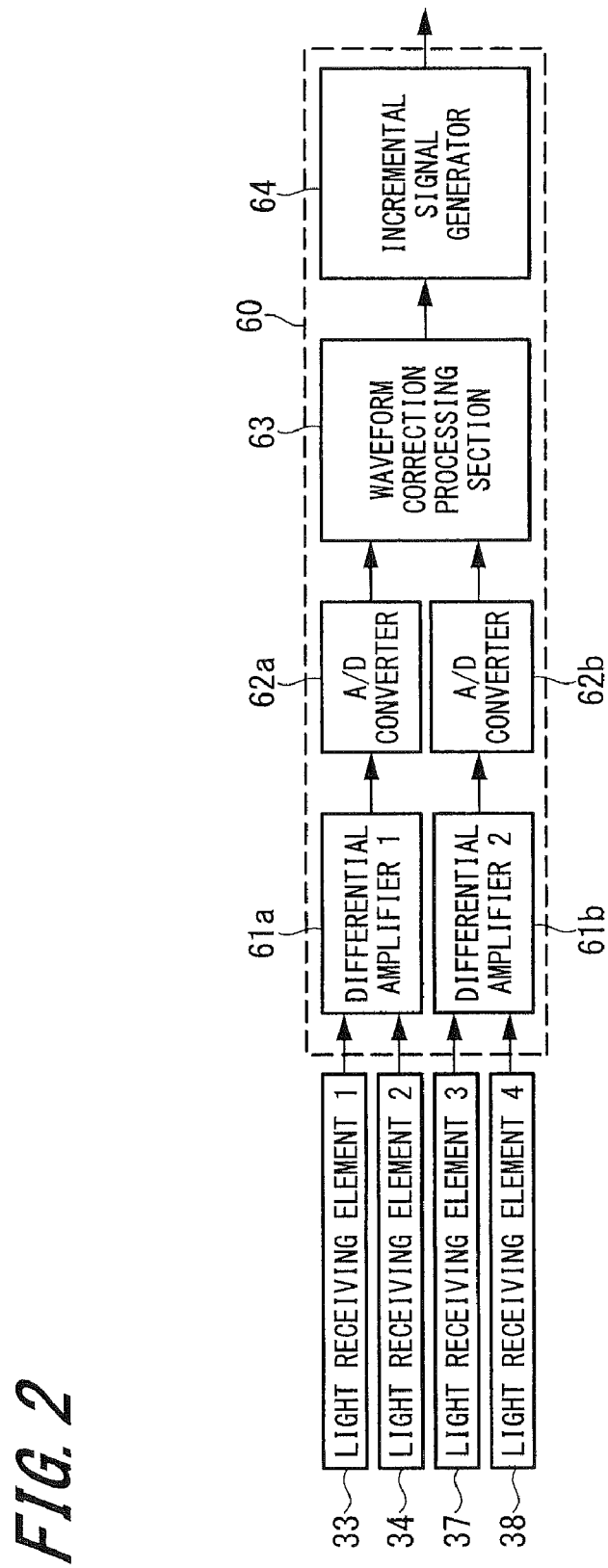
FIG. 2 is a block diagram schematically showing the configuration of a relative position information output section.

For example, as shown in FIG. 2, in the relative position information output section 60, the signal obtained by the first light receiving element 33 and the signal obtained by the second light receiving element 34 whose phases are different from each other by 180 degrees are differential-amplified by a differential amplifier 61a, so that the DC component of the interference signal is cancelled.

Further, such signal is A/D-converted by an A/D converter 62a, and signal amplitude, offset and phase thereof are corrected by a waveform correction processing section 63. In an incremental signal generator 64, such signal is calculated as an A-phase incremental signal, for example.

Similarly, the signal obtained in the third light receiving element 37 and fourth light receiving element 38 is differential-amplified by a differential amplifier 61b and A/D-converted by an A/D converter 62b. Further, signal amplitude, offset and phase of the signal are corrected by the waveform correction processing section 63, and the signal is outputted from the incremental signal generator 64 as a B-phase incremental signal whose phase is different from that of the A-phased incremental signal.

Whether the two phases of incremental signals obtained in the aforesaid manner are positive or negative is discriminated by a pulse discrimination circuit or the like (not shown in the drawings), and thereby whether the amount of the displacement of the surface-to-be-measured in the height direction is in positive direction or negative direction can be detected.

Further, it is possible to perform measurement to see how many the aforesaid cycles of the intensity of the interference light of the first beam and the second beam have changed by counting phase-change per unit time of the incremental signal with a counter (not shown in the drawings). Thus, the amount of the displacement of the surface-to-be-measured in the height direction can be detected by the aforesaid processing.

Incidentally, the relative position information outputted by the relative position information output section 60 of the present embodiment may either be the aforesaid two phases of incremental signals, or be a signal including amount and direction of the displacement calculated based on the two phases of incremental signals.

Next, the other of the two beams split by the second beam splitter 20, i.e., the beam transmitted through the beam splitter 12, will be described below.

The polarizing plate 21 for only allowing the second beam to transmit therethrough is disposed in the optical path of the first beam and the second beam transmitted through the beam splitter 12. With such an arrangement, only the second beam (which is the reflected light from the surface-to-be-measured of the object-to-be-measured 9) is extracted, and the offset light is removed.

Further, a chromium film or a dielectric multilayer film may be formed on the polarizing plate 21, and thereby the polarizing plate may also function as a beam splitter.

In such a case, since the function of the beam splitter 12 and the function of the polarizing plate 21 are accomplished by one component, the number of components can be reduced.

Further, the second beam transmitted through the polarizing plate 21 is incident on the second light receiving section 40.

Further, the second beam incident on the second light receiving section 40 has astigmatism generated therein by the astigmatism generator 10.

In the present embodiment, the beam splitter 12 inclined with respect to the optical axis of the beam is provided in the optical path of the first beam and the second beam converged by the condensing lens 11, and thereby astigmatism is generated in the beam transmitted through the beam splitter 12.

Astigmatism may also be generated by providing a cylindrical lens; however, in the present embodiment, the beam splitter 12 is preferably to be employed because the beam splitter 12 splits the beam into two beams in different directions while generating astigmatism, and therefore the number of the components can be reduced.

Figures 3A, 3B, 3C:
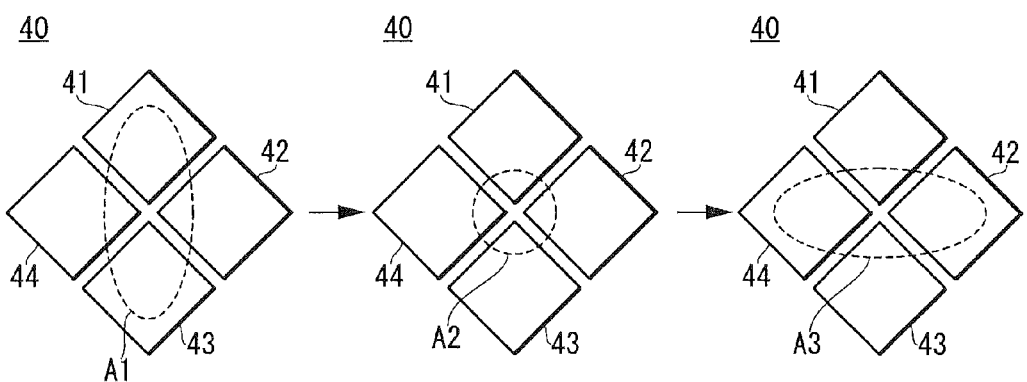
FIGS. 3A to 3C are views each showing a spot of the light received by a second light receiving section.

As shown in FIGS. 3A to 3C, the second light receiving section 40 includes a fifth light receiving element 41, a sixth light receiving element 42, a seventh light receiving element 43, and an eighth light receiving element 44. The shape of the spot of the second beam formed on the second light receiving section changes depending on the position of the surface-to-be-measured in the height direction.

For example, as shown in FIG. 3A, the spot A1 of the second beam on the second light receiving section 40 becomes an oval shape in the case where the focus of the second beam irradiated onto the surface-to-be-measured is located at a position higher than the surface-to-be-measured.

Further, as shown in FIG. 3B, the spot A2 of the second beam on the second light receiving section 40 becomes a round shape in the case where the focus of the second beam irradiated onto the surface-to-be-measured is located on the surface-to-be-measured.

Further, as shown in FIG. 3C, the spot A3 of the second beam on the second light receiving section 40 becomes an oval shape in the case where the focus of the second beam irradiated onto the surface-to-be-measured is located at a position lower than the surface-to-be-measured, wherein the long axis direction of the oval-shaped spot A3 is rotated by 90 degrees compared with that of the oval-shaped spot A1.

Assuming that the output signals of the light receiving element 41, the light receiving element 42, the light receiving element 43 and the light receiving element 44 are respectively A, B, C and D, a focus error signal $S_{FE}$ (which indicates the shift of the second beam irradiated onto the surface-to-be-measured from the focus position) can be expressed by the following equation (1):

$$S_{FE}=(A+C)-(B+D) \tag{1}$$

Figure 4:
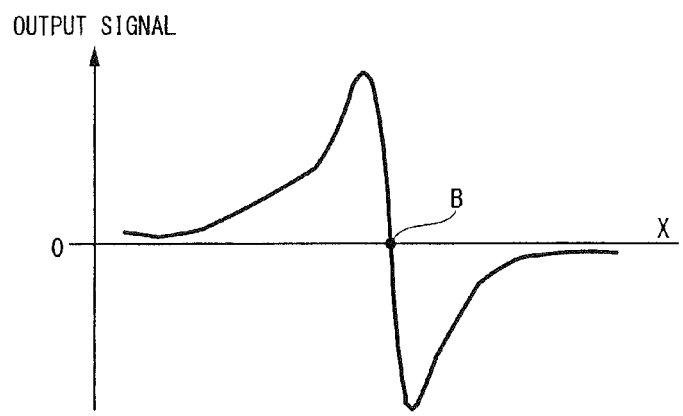
FIG. 4 is a graph for explaining a focus error signal.

FIG. 4 is a graph showing the characteristic of the focus error signal obtained by equation (1). In FIG. 4, the horizontal axis represents the position of the surface-to-be-measured in the height direction, and the vertical axis represents the focus error signal.

As shown by point B, for example, the focus error signal is equal to zero when the focus of the second beam irradiated onto the surface-to-be-measured is located on the surface-to-be-measured.

In the present embodiment, since the objective lens 5 is fixed, the focus position of the second beam irradiated onto the surface-to-be-measured is maintained constant. Thus, the height of the surface-to-be-measured when the focus error signal is equal to zero is constantly the same, and therefore the position when the focus error signal is equal to zero can be used as the reference point for detecting displacement.

The arithmetic section for obtaining the focus error signal may either be built into the second light receiving section 40, or be arranged in the absolute position information output section 50. Further, the absolute position information output section 50 A/D-converts the focus error signal, and outputs the converted value.

Incidentally, a light-scattering body (for example, a frosted glass or the like) may be arranged in the optical path between the beam splitter 12 and the second light receiving section 40. With such an arrangement, it is possible to obtain a uniform light intensity distribution in a cross section perpendicular to the optical axis direction of the second beam incident on the second light receiving section 40. Thus, the possibility that fine flaw, fine foreign matter and/or the like on the surface-to-be-measured is detected can be reduced, the influence of the surface roughness can be reduced, and therefore it is possible to measure the average height of the surface-to-be-measured.

Further, if the aforesaid light-scattering body is vibrated at a frequency of 1 kHz, for example, to variously change the scattering direction, speckle on the light receiving elements 41, 42, 43 and 44 will be averaged, and therefore speckle contrast will be reduced.

Further, an aperture having a predetermined shape may be arranged in the optical path of the second beam between the objective lens 5 and the second light receiving section 40, so that the light reflected from the surface-to-be-measured and incident on the objective lens 5 again at a specific incidence angle and incident position is shut off. With such an arrangement, the diffracted light caused by foreign matter attached on the surface-to-be-measured and/or unevenness of the surface-to-be-measured can be prevented from being received by the second light receiving section 40 as stray light.

Further, the light receiving elements of the first light receiving section and the second light receiving section may also receive the interference light and/or the light having astigmatism generated therein using optical fibers. By using the optical fibers, the light receiving elements at the positions can be arranged at positions separated from the optical system of the displacement detecting device 100.

Thus, by arranging the light receiving elements in the vicinity of the absolute position information output section 50 and the relative position information output section 60, telecommunication distance from the light receiving elements to the absolute position information output section 50 and the relative position information output section 60 can be reduced, and therefore response speed can be increased.

As described above, in the displacement detecting device 100, the light emitted from the light source 1 is split into two beams, in which the first beam is incident on the reflecting member 8, and the second beam is incident on the surface-to-be-measured.

Further, the absolute position information is detected by obtaining the focus error signal using the reflected light from the surface-to-be-measured, and the relative position information is obtained based on the interference light of the reflected light from the reflecting member 8 and the reflected light from the surface-to-be-measured.

In the conventional art, the position in the height direction is detected based on the focus error signal only. Thus, a correction table needs to be used to compensate the nonlinearity of the focus error signal.

However, in the displacement detecting device 100 of the present embodiment, the interference light of the reflected light from the fixed reflecting member 8 and the reflected light from the surface-to-be-measured is measured. The intensity of the interference light periodically changes according to the amount of the displacement of the surface-to-be-measured. In other words, linearity of the signal can be reliably retained by using the change of the intensity of the interference light as a scale. Since the period of the change of the intensity of the interference light is determined by the wavelength of the light, the change of the intensity of the interference light can be used as an accurate and fine scale.

Further, the reference point of the scale obtained based on the change of the intensity of the interference light can be obtained based on the focus error signal, which is obtained based on the reflected light from the surface-to-be-measured.

Thus, in the present embodiment, the displacement can be accurately detected by counting the pulses (i.e., the phase information) generated by the relative position information output section with the position where the focus error signal is equal to zero as the reference, for example.

Further, since the absolute position information (such as the focus error signal or the like) is obtained for determining the absolute position as the reference, in the present embodiment, it is not necessary to move the objective lens 5 up and down following the surface-to-be-measured like in the conventional art.

Thus, the drive mechanism for moving the objective lens 5 is eliminated, and therefore heat generation can be reduced. Further, there is no limitation in service conditions caused by the response frequency of the drive mechanism.

Further, it is preferred that, in any position of the focus error signal, the count value of the interference light in the relative position information output section can be changed to any value.

Thus, even if the surface-to-be-measured goes out from the measuring range, the original position information can be promptly counted as soon as the surface-to-be-measured is detected again.

Furthermore, it is also possible to previously move the surface-to-be-measured up and down to perform measurement so as to previously obtain the absolute position information and the relative position information. In such a case, it is possible to perform linear correction on the waveform near the zero cross of the focus error signal by obtaining the difference between the absolute position information and the relative position information and obtaining the correlation between the absolute position information and the relative position information.

Further, by obtaining the correlation between the absolute position information and the relative position information and using the correlation as a correction value, it is possible to detect the displacement based only on the position information of the absolute position information output section 50 obtained based on the focus error signal even in the case where the surface-to-be-measured is lost from sight and therefore detection becomes impossible.

Further, since the displacement detecting device 100 is directly corrected in the environment where the displacement detecting device 100 is actually used based on the information obtained in that environment, it is possible to detect the displacement with higher accuracy.

Further, it is also possible to use different measuring methods according to the environment. For example, in the environment where the air largely fluctuates, the displacement may be detected using the information outputted from the absolute position information output section 50, instead of using the information outputted from the relative position information output section 60.

While in the case where high-speed response is required or where the surface roughness of the surface-to-be-measured is large, the displacement may be detected using the information outputted from the relative position information output section 60, instead of using the information outputted from the absolute position information output section 50.

Further, it is preferred that the surface-to-be-measured of the object-to-be-measured 9 is subjected to a mirror processing for reflecting the light emitted from the light source 1, so that it is possible to obtain a signal having higher S/N ratio.

Further, the object-to-be-measured can be various objects, instead of being particularly limited. For example, a diffraction grating capable of reflecting the light having the same wavelength as that of the light emitted from the light source 1 can be used as the object-to-be-measured 9.

In such a case, it is preferred that the displacement detecting device is configured by the displacement detecting device 100 of the present embodiment and a linear encoder which uses a so-called "linear scale" for detecting the position in the surface direction of a two-dimensional surface.

For example, the diffraction grating is attached to a stage, the displacement in the direction along the diffraction grating surface is measured by the linear encoder, and the displacement in the direction perpendicular to the diffraction grating surface is measured by the displacement detecting device 100 of the present embodiment.

With such an arrangement, the displacement of the stage in three-dimensional direction can be detected, and therefore it is possible to accurately perform positioning of the stage in equipment which requires accurate three-dimensional position control such as micromachining equipment.

In such a case, a reflective film for reflecting the light from the light source 1 may be formed flat on the surface of the diffraction grating. The displacement detecting device 100 measures the reflected light from the reflective film to detect the displacement of in the height direction.

Since no diffracted light is caused by the diffraction grating in the light emitted from the light source 1, it is possible to accurately detect the displacement. Further, the linear scale detects the diffracted light and the like by using a light source which emits the light capable of being transmitted through the reflective film.

Further, the reflective film may also be formed on the rear side of the diffraction grating. In such a case, the wavelength of the light emitted from the light source 1 and the material of the diffraction grating are selected so that the light emitted from the light source 1 is transmissive with respect to the material of the diffraction grating. With such an arrangement, the diffracted light can be suppressed from being generated in the light incident from light source 1.

Further, the direction in which the diffracted light is generated may be controlled by causing the light emitted from the linear scale obliquely incident on the diffraction grating, so that the diffracted light is not detected by the displacement detecting device 100.

2. Second Embodiment

In the first embodiment, one light source is used. In a second embodiment to be described below, two light sources having different wavelengths are used.

Figure 5:
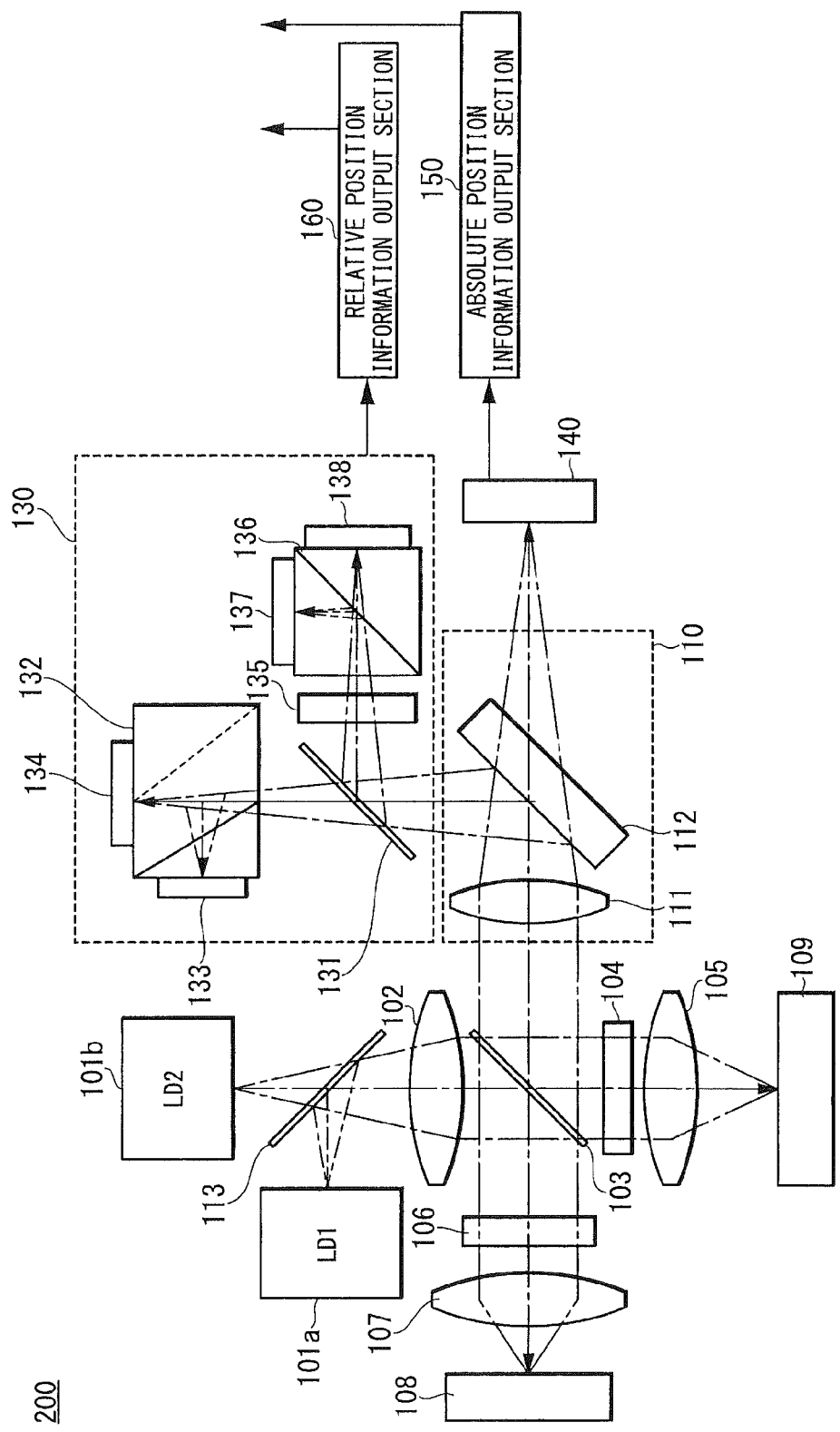
FIG. 5 is a view schematically showing the configuration of a displacement detecting device according to a second embodiment of the present invention.

FIG. 5 is a view schematically showing the configuration of a displacement detecting device 200 according to the second embodiment of the present invention.

The displacement detecting device 200 according to the present embodiment includes a first light source 101a and a first beam splitter 103 adapted to split the light emitted from the first light source 101a into a first beam and a second beam.

The displacement detecting device 200 further includes a reflecting member 108 adapted to reflect the first beam split by the first beam splitter 103.

The displacement detecting device 200 further includes a second light source 101b adapted to emit light having different wavelength from that of the first light source 101a, and an objective lens 105 adapted to condense the second beam, which is emitted from the first light source 101a and split by the first beam splitter 103, and a third beam emitted from the second light source 101b on an object-to-be-measured 109.

The displacement detecting device 200 further includes a second beam splitter 112 and an astigmatism generator 110, wherein the second beam splitter 112 is adapted to extract the third beam from the first beam, the second beam and the third beam, and the astigmatism generator 110 is adapted to generate astigmatism in the extracted third beam.

The displacement detecting device 200 further includes a first light receiving section 130 adapted to receive the interference light of the first beam reflected by the reflecting member 108 and the second beam reflected by the surface-to-be-measured, and a second light receiving section 140 adapted to receive the third beam extracted by the second beam splitter 112.

The displacement detecting device 200 further includes a relative position information output section 160 adapted to output relative position information based on the signal obtained by the first light receiving section 130, and an absolute position information output section 150 adapted to output absolute position information based on the signal obtained by the second light receiving section 140.

Similar to the first embodiment, the first light source 101a and the second light source 101b may be one of various light sources such as a semiconductor laser diode, a super luminescent diode, a luminescent diode and the like. However, the wavelength of the light emitted from the first light source 101a and the wavelength of the light emitted from the second light source 101b are different from each other.

It is preferred that, in the light emitted from the first light source 101a, p-polarized components and s-polarized components are equal to each other with respect to the first beam splitter (such as a polarizing beam splitter or the like) 103.

Further, the light emitted from the second light source 101b is p-polarized light with respect to the first beam splitter 103. Thus, the polarization direction of the light emitted from the second light source 101b may be aligned by providing a polarizing plate (not shown in the drawings) or the like.

The light emitted from the first light source 101a is reflected by a beam combiner (such as a wavelength-selective filter or the like) 113 and incident on a lens (such as a collimator lens or the like) 102.

For example, the light collimated by the lens 102 is incident on the beam splitter (such as a polarizing beam splitter or the like) 103 where the light is split into the first beam, which is composed of s-polarized component, and the second beam, which is composed of p-polarized component.

The first beam reflected by the beam splitter 103 is transmitted through a phase plate (such as a quarter-wave plate or the like) 106 so as to become circularly polarized light, and such circularly polarized light is incident on the reflecting member 108 through a condensing lens 107.

Further, the first beam reflected by the reflecting member 108 is transmitted through the condensing lens 107 and incident on the phase plate 106 so as to become p-polarized light.

The first beam, which has been converted to the p-polarized light, is transmitted through the first beam splitter 103 and incident on a condensing lens 111.

On the other hand, the second beam transmitted through the beam splitter 103 is transmitted through a phase plate (such as a quarter-wave plate or the like) 104 and condensed on the surface-to-be-measured of the object-to-be-measured 109 by the objective lens 105.

The second beam reflected by the object-to-be-measured is incident on the phase plate 104 again through the objective lens 105.

The second beam is transmitted through the phase plate 104 twice to thereby become s-polarized light, and such s-polarized light is reflected by the first beam splitter 103 and incident on the condensing lens 111.

In the present embodiment, the first beam and the second beam incident on the condensing lens 111 are received by the first light receiving section 130 in its entirety without being split.

The second beam splitter (such as a wavelength-selective filter or the like) 112 is disposed in the optical path of the light condensed by the condensing lens 111. The second beam splitter 112 reflects the light having the same wavelength as the light emitted from the first light source 101a and transmits the light having the same wavelength as the light emitted from the second light source 101b.

Thus, the first beam and the second beam are reflected by the second beam splitter 112, and incident on the first light receiving section 130.

The first light receiving section 130 receives the interference light of the first beam and the second beam, wherein the first beam is emitted from the first light source 101a and reflected by the reflecting member 108, and the second beam is emitted from the first light source 101a and reflected by the surface-to-be-measured.

The first light receiving section 130 may have the same configuration as that of the first light receiving section 30 of the first embodiment.

The first beam and the second beam reflected by the second beam splitter 112 are incident on a half mirror 131 to be respectively split into two beams.

The first beam and the second beam transmitted through the half mirror 131 are incident on a polarizing beam splitter 132.

The polarizing beam splitter 132 is obliquely disposed so that the incidence plane of the polarizing beam splitter 132 is inclined with respect to both the polarization direction of the first beam and the polarization direction of the second beam at an angle of 45 degrees. Thus, the p-polarized component and the s-polarized component with respect to the polarizing beam splitter 132 are generated in both the first beam and the second beam. The s-polarized component and the p-polarized component are respectively split and extracted by the polarizing beam splitter 132, and thereby the first beam and the second beam are interfered with each other.

The interference light of the s-polarized component of the first beam and the s-polarized component of the second beam reflected by the polarizing beam splitter 132 is received by a first light receiving element 133. Further, the interference light of the p-polarized component of the first beam and the p-polarized component of the second beam transmitted through the polarizing beam splitter 132 is received by a second light receiving element 134.

Further, the first beam and the second beam reflected by the half mirror 131 are transmitted through a phase plate (such as a quarter-wave plate or the like) 135 and thereby become circularly polarized light beams with mutually reversed rotational directions. The two circularly polarized light beams with mutually reversed rotational directions are superimposed on each other to become linearly polarized light whose polarization direction rotates.

The s-polarized component of such linearly polarized light is reflected by a polarizing beam splitter 136 and received by a third light receiving element 137. Further, the p-polarized component is transmitted through the polarizing beam splitter 136 and received by a fourth light receiving element 138.

In the relative position information output section 160, relative position information, such as two phases of incremental signals, is outputted by performing the same processing as that described in the first embodiment (see FIG. 2) with respect to the signals obtained by the four light receiving elements 133, 134, 137, 138.

On the other hand, the third beam emitted from the second light source 101b is transmitted through the beam combiner 113. The third beam transmitted through the beam combiner 113 is, for example, collimated by the lens 102 and incident on the first beam splitter (such as a polarizing beam splitter or the like) 103.

Since the third beam is p-polarized light with respect to the first beam splitter 103, the third beam is transmitted through the first beam splitter 103 and condensed on the surface-to-be-measured of the object-to-be-measured 109 by the objective lens 105.

In the present embodiment, the objective lens 105 is fixed, and the focus position of the third beam is maintained constant. The focus position does not have to be on the surface-to-be-measured, but may also be in the vicinity of the surface-to-be-measured. The influence of the measurement error caused by the surface roughness of the surface-to-be-measured, the foreign matter attached on the surface-to-be-measured and/or the like can be reduced by shifting the imaging position from the surface-to-be-measured to therefore increase the diameter of the spot.

The third beam reflected by the surface-to-be-measured is incident on the first beam splitter 103 again through the objective lens 105.

The phase plate (such as a quarter-wave plate or the like) 104 is disposed in the optical path between the first beam splitter 103 and the surface-to-be-measured. When going to and returning from the surface-to-be-measured, the third beam is transmitted through the phase plate 104 twice so as to become p-polarized light. Thus, the third beam is reflected by the first beam splitter 103 and incident on the condensing lens 111.

The third beam incident on the condensing lens 111 is transmitted through the second beam splitter (such as a wavelength-selective filter or the like) 112 and received by the second light receiving section 140.

In the present embodiment, the astigmatism generator 110 is also configured by the condensing lens 111 and the second beam splitter 112. The convergent light of the third beam is transmitted through the second beam splitter 112 arranged obliquely with respect to the optical axis and thereby has astigmatism generated therein.

Since the astigmatism generator 110 is configured by the condensing lens 111 and the second beam splitter 112, the astigmatism can be generated without employing a cylindrical lens or the like, and therefore the number of components can be reduced.

Similar to the first embodiment (see FIGS. 3A to 3C), the second light receiving section 140 includes four light receiving elements, and the absolute position information output section 150 generates a focus error signal by using the signals obtained by the light receiving elements.

In the present embodiment, the light emitted from the first light source 101a is incident on the reflecting member 108 and the surface-to-be-measured, and the relative position information is generated based on the interference light of the reflected light of the reflecting member 108 and the reflected light of the surface-to-be-measured.

Further, the light emitted from the second light source 101b is incident on the surface-to-be-measured, and the absolute position information is generated based on the reflected light of the surface-to-be-measured.

Thus, in the present embodiment, it is also possible to determine a reference point (such as the position where the zero cross point of the focus error signal, for example, is detected), and obtain the displacement from the reference point based on the relative position information generated by the relative position information output section 160.

Further, since the displacement in the height direction can be measured without driving the objective lens 105, it is not necessary to provide a drive mechanism. Thus, there is neither heat generated by the drive mechanism, nor limitation in response frequency of the drive mechanism. Consequently, service conditions can be eased, and therefore it becomes possible to perform measurement in various environments.

Further, in the present embodiment, the wavelength of the light used to detect the relative position information and the wavelength of the light used to detect the absolute position information are different from each other, and these beams of light are split by the second beam splitter (such as a wavelength-selective filter or the like). Since the output of the two light sources can be maximally used, it is possible to perform displacement detection at higher S/N ratio.

Further, the first light source 101a and the second light source 101b may alternately emit light. In such a case, the relative position information and the absolute position information are alternately obtained, and the displacement may be detected by synchronizing the information.

By causing the light sources to alternately emit light, stray light (i.e., the light generated in the case where the light from the first light source 101a is incident on the 140, and/or where the light from the second light source 101b is incident on the

3. Third Embodiment

In the present invention, the absolute position information of the displacement is obtained based on the astigmatism of the reflected light from the surface-to-be-measured, and the relative position information is obtained based on the interference light of the reflected light from the surface-to-be-measured and the reflected light from a specific fixed reference surface such as the reflecting member or the like.

In the case where the focus error signal is obtained by the astigmatism method, it is necessary to condense the light on the surface-to-be-measured to a certain level. However, when measuring the change cycle of the intensity of the interference light, the light does not have to be condensed on the surface-to-be-measured.

In the present embodiment, two light sources are used, and the lights emitted from the two light sources are respectively assigned to measure the astigmatism and to measure the interference light. Further, the lights emitted from the two light sources are respectively condensed on the surface-to-be-measured with different spot diameters.

With such an arrangement, the light used for obtaining the focus error signal can be condensed on the surface-to-be-measured to a certain level, while the light used for measuring the interference light can be incident on the surface-to-be-measured with a spot diameter larger than that of the light used for obtaining the focus error signal.

Thus, it is possible to perform the relative position detection in wider range while maintaining high measurement accuracy.

Figure 6:
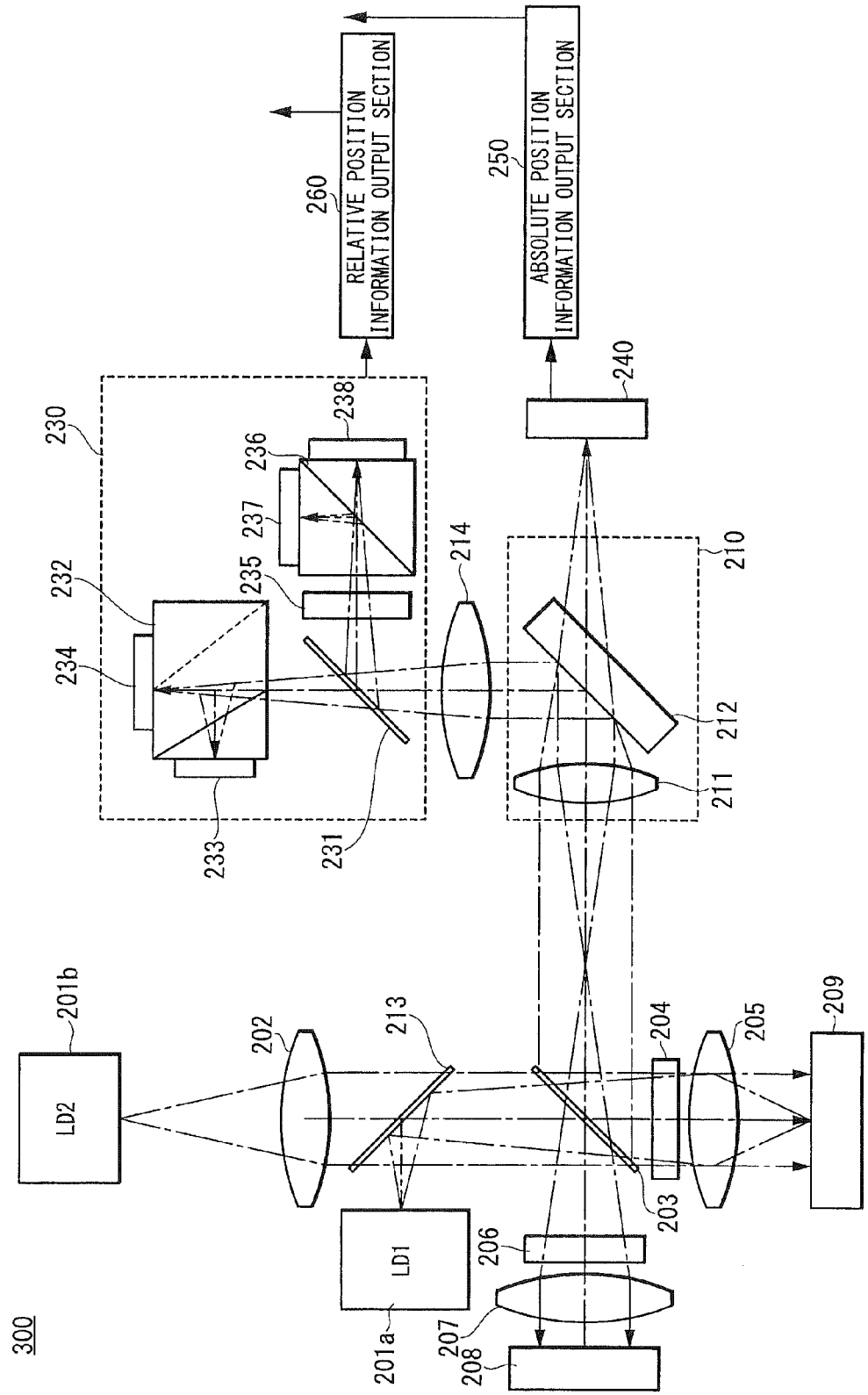
FIG. 6 is a view schematically showing the configuration of a displacement detecting device according to a third embodiment of the present invention.

FIG. 6 is a view schematically showing the configuration of a displacement detecting device 300 according to a third embodiment of the present invention.

The displacement detecting device 300 according to the present embodiment includes a first light source 201a and a first beam splitter 203 adapted to split the light emitted from the first light source 201a into a first beam and a second beam.

The displacement detecting device 300 further includes a reflecting member 208 adapted to reflect the first beam split by the first beam splitter 203.

The displacement detecting device 300 further includes a second light source 201b adapted to emit light having different wavelength from that of the first light source 201a, and an objective lens 205 adapted to condense the second beam, which is emitted from the first light source 201a and split by the first beam splitter 203, and a third beam emitted from the second light source 201b on an object-to-be-measured 209.

The displacement detecting device 300 further includes a second beam splitter 212 and an astigmatism generator 210, wherein the second beam splitter 212 is adapted to extract the third beam from the first beam, the second beam and the third beam, and the astigmatism generator 210 is adapted to generate astigmatism in the extracted third beam.

The displacement detecting device 300 further includes a first light receiving section 230 adapted to receive the interference light of the first beam reflected by the reflecting member 208 and the second beam reflected by the surface-to-be-measured, and a second light receiving section 240 adapted to receive the third beam extracted by the second beam splitter 212.

The displacement detecting device 300 further includes a relative position information output section 260 adapted to output relative position information based on the signal obtained by the first light receiving section 230, and an absolute position information output section 250 adapted to output absolute position information based on the signal obtained by the second light receiving section 240.

Similar to the first and second embodiments, the first light source 201a and the second light source 201b may be one of various light sources such as a semiconductor laser diode, a super luminescent diode, a luminescent diode and the like. However, the wavelength of the light emitted from the first light source 201a and the wavelength of the light emitted from the second light source 201b are different from each other.

It is preferred that, in the light emitted from the first light source 201a, the p-polarized components and the s-polarized components are equal to each other with respect to the first beam splitter (such as a polarizing beam splitter or the like) 203.

Further, the light emitted from the second light source 201b is p-polarized light with respect to the first beam splitter 203. Also, a polarizing plate can be used to extract p-polarized light only.

The light emitted from the first light source 201a is reflected by a beam combiner 213 and incident on the first beam splitter (such as a polarizing beam splitter or the like) 203. The second beam splitter 213 reflects the light having the same wavelength as the light emitted from the first light source 201a and transmits the light having the same wavelength as the light emitted from the second light source 201b.

The light emitted from the first light source 201a and incident on the first beam splitter 203 is split into the first beam, which is composed of s-polarized component, and the second beam, which is composed of p-polarized component.

The first beam reflected by the beam splitter 203 is, for example, collimated to parallel light by a lens 207 and incident on the reflecting member 208. Further, the light is reflected by the reflecting member 208 and transmitted through the lens 207 to become convergent light, and such convergent light is incident on the first beam splitter 203 again.

A phase plate (such as a quarter-wave plate or the like) 206 is disposed in the optical path between the first beam splitter 203 and the reflecting member 208, so that the first beam incident on the first beam splitter 203 again becomes p-polarized light. Thus, the first beam is transmitted through the first beam splitter 203 and incident on a lens 211.

The second beam transmitted through the first beam splitter 203 is collimated by the objective lens 205 to become parallel light, for example, and such parallel light is incident on the surface-to-be-measured of the object-to-be-measured 209. The second beam reflected by the surface-to-be-measured is converted to convergent light by the objective lens 205 and incident on the first beam splitter 203.

A phase plate (such as a quarter-wave plate or the like) 204 is disposed in the optical path between the first beam splitter 203 and the object-to-be-measured 209, so that the second beam incident on the first beam splitter 203 again becomes s-polarized light. Thus, the second beam is reflected by the first beam splitter 203 and incident on the lens 211.

On the other hand, the third beam emitted from the second light source 201b is, for example, collimated into parallel light by a collimator lens 202, transmitted through the beam combiner (such as a wavelength-selective filter or the like) 213, and incident on the first beam splitter 203.

Since the third beam is p-polarized light with respect to the first beam splitter 203, the third beam is transmitted through the first beam splitter 203 and condensed on the surface-to-be-measured by the objective lens 205. Further, the third beam reflected by the surface-to-be-measured is transmitted through the objective lens 205 to become parallel light, and incident on the first beam splitter 203.

During the aforesaid process, since the third beam is transmitted through the phase plate (such as a quarter-wave plate or the like) 204 twice and thereby the polarization direction thereof is rotated by 90 degrees, the third beam is reflected by the first beam splitter 203. Further, the reflected third beam is incident on the lens 211.

In the present embodiment, the light emitted from the first light source 201*a* is incident on the objective lens 205 and the lens 207 as divergent light, and these lenses are also used as, for example, collimator lenses to collimate the light emitted from the first light source 201*a*.

With such an arrangement, the first beam and the second beam can be incident on the surface-to-be-measured and the reflecting member 208 with a spot diameter larger than that formed on the surface-to-be-measured by the third beam emitted from the second light source 201*b*.

Incidentally, the light from the first light source 201*a* and the light from the second light source 201*b* may be incident on the surface-to-be-measured with different spot diameters in various known optical systems, instead of being limited to the optical system exemplified herein.

Further, similar to the second embodiment (see FIG. 5), in the present embodiment, the first beam and the second beam incident on the condensing lens 211 are received by the first light receiving section in its entirety without being split.

The first beam and the second beam incident on the lens 211 are, for example, collimated and reflected by the second beam splitter (such as a wavelength-selective filter or the like) 212.

The first beam and the second beam reflected by the second beam splitter 212 are condensed on the first light receiving section 230 by a lens 214.

Further, in the present embodiment, the first light receiving section 230 may have the same configuration as that of the first light receiving section 30 of the first embodiment (see FIG. 1).

The first light receiving section 230 measures the interference light of the first beam and the second beam.

The first beam and the second beam reflected by the second beam splitter 212 are incident on a half mirror 231 to be split into two beams that each include the first beam and the second beam.

The first beam and the second beam transmitted through the half mirror 231 are incident on a polarizing beam splitter 232.

The polarizing beam splitter 232 is obliquely disposed so that the incidence plane of the polarizing beam splitter 132 is inclined with respect to both the polarization direction of the first beam and the polarization direction of the second beam at an angle of 45 degrees. Thus, the p-polarized component and the s-polarized component with respect to the polarizing beam splitter 132 are generated in both the first beam and the second beam, and therefore it becomes possible for the first beam and the second beam to interfere with each other.

The interference light of the s-polarized component of the first beam and the s-polarized component of the second beam reflected by the polarizing beam splitter 232 is received by a first light receiving element 233. Further, the interference light of the first beam and the second beam, which are composed of the p-polarized light, transmitted through the polarizing beam splitter 232 is received by a second light receiving element 234.

Further, the first beam and the second beam reflected by the half mirror 231 are transmitted through a phase plate (such as a quarter-wave plate or the like) 235 and thereby become circularly polarized light beams with mutually reversed rotational directions. The two circularly polarized light beams with mutually reversed rotational directions are superimposed on each other to become linearly polarized light whose polarization direction rotates according to the displacement of the surface-to-be-measured.

The s-polarized component of such linearly polarized light is reflected by a polarizing beam splitter 236 and received by a third light receiving element 237. Further, the p-polarized component is transmitted through the polarizing beam splitter 236 and received by a fourth light receiving element 238.

Further, similar to the second embodiment (see FIG. 2), the relative position information output section 260 obtains the relative position information based on the signals obtained by the first light receiving elements 233, 234, 237, 238, and outputs the relative position information.

On the other hand, the third beam incident on the lens 211 is transmitted through the second beam splitter (such as a wavelength-selective filter or the like) 212 and received by the second light receiving section 240.

In the present embodiment, the astigmatism generator 210 is also configured by the condensing lens 211 and the second beam splitter 212 arranged obliquely with respect to the optical axis of the condensing lens 211. With such an arrangement, the astigmatism can be generated without employing a cylindrical lens or the like, and therefore the number of components can be reduced.

Similar to the first embodiment (see FIGS. 3A to 3C), the second light receiving section 240 includes four light receiving elements, and the absolute position information output section 250 generates the absolute position information (such as the focus error signal or the like) by using the signals obtained by the light receiving elements, and outputs the generated absolute position information.

In such a manner, in the present embodiment, the absolute position information is obtained based on the light reflected by the surface-to-be-measured, and the relative position information is obtained based on the interference light of the light reflected by the surface-to-be-measured and the light reflected by the fixed reflecting member.

Thus, it is possible to determine the reference position based on the absolute position information such as the focus error signal or the like, and obtain the displacement relative to the reference position based on the relative position information.

Since the absolute position information and the relative position information can be obtained without driving the objective lens 205 up and down, the drive mechanism in the conventional art can be eliminated. As a result, heat can be reduced, and limitation in service conditions caused by the response frequency can be eased.

Further, in the present embodiment, the spot diameter of the light incident on the surface-to-be-measured for obtaining the relative position information can be set larger than the spot diameter of the light for obtaining the absolute position information, for example. Thus, it is possible to expand the measuring range of the relative position information.

Incidentally, in the second embodiment and third embodiment, it is also preferred that, in any position of the focus error signal, the count value of the interference light in the relative position information output section can be changed to any value.

Thus, even if the surface-to-be-measured goes out from the measuring range, the original position information can be promptly counted as soon as the surface-to-be-measured is detected again.

Further, the present embodiment is the same as the first embodiment in that it is possible to previously move the surface-to-be-measured up and down to perform measurement so as to previously obtain the absolute position information and the relative position information and obtain a correction value.

By correcting the absolute position information with the correction value, the displacement can be counted based on the absolute position information obtained based on the focus error signal even in the case where the surface-to-be-measured is lost from sight and therefore detection becomes impossible.

Further, it is preferred that the surface-to-be-measured of the object-to-be-measured is subjected to a mirror processing for reflecting the light emitted from the light source, so that it is possible to obtain a signal having higher S/N ratio.

Further, in the second embodiment and third embodiment, the object-to-be-measured can be various objects, instead of being particularly limited. Thus, it is possible to detect three-dimensional displacement if a diffraction grating is used as the object-to-be-measured.

In such a case, a reflective film for reflecting the light from the light source 1 may either be formed flat on the surface of the diffraction grating, or be formed on the rear side of the diffraction grating.

Further, similar to the first embodiment, it is preferred that the light-reflecting film of the reflecting member is made of a metal such as gold or the like. Thus, change in wavelength and property of the polarized light caused by the change in humidity can be suppressed, so that it is possible to perform position detection with stability.

Further, a light-scattering body (for example, a frosted glass or the like) may be arranged in the optical path between the second beam splitter and the second light receiving section.

Further, an aperture having a predetermined shape may be arranged in the optical path of the third beam between the objective lens and the second light receiving section, so that the light reflected from the surface-to-be-measured and incident on the objective lens again at a specific incidence angle and incident position is shut off.

Further, the light receiving elements of the first light receiving section and the second light receiving section may also receive the interference light and/or the light having astigmatism generated therein using optical fibers.

The preferred embodiments of the displacement detecting device according to the present invention have described above. It is to be understood that the present invention is not limited to the embodiments described above, and various modifications and variations can be made without departing from the spirit and scope of the present invention.

What is claimed is:

1. A displacement detecting device comprising:
   a light source;
   a first beam splitter adapted to split the light emitted from the light source into a first beam and a second beam;
   a reflecting member adapted to reflect the first beam split by the first beam splitter;
   an objective lens adapted to condense the second beam split by the first beam splitter on a surface-to-be-measured;
   a first light receiving section adapted to receive interference light of the first beam reflected by the reflecting member and the second beam reflected by the surface-to-be-measured;
   a relative position information output section adapted to output relative position information in height direction of the surface-to-be-measured based on intensity of the interference light received by the first light receiving section;
   a second beam splitter adapted to extract a part of the second beam reflected by the surface-to-be-measured;
   an astigmatism generator adapted to generate astigmatism in the second beam extracted by the second beam splitter;
   a second light receiving section adapted to receive the second beam having the astigmatism generated therein by the astigmatism generator; and
   an absolute position information output section adapted to generate absolute position information in height direction of the surface-to-be-measured based on intensity of the received light detected by the second light receiving section, and output the generated absolute position information.

2. The displacement detecting device according to claim 1, wherein the light source includes a first light source section and a second light source section which respectively emit beams of light having different wavelengths, in which the beam emitted from the first light source section is split by the first beam splitter into the first beam and the second beam, and the beam emitted from the second light source section is incident on the surface-to-be-measured as the second beam through the first beam splitter, and the second beam splitter extracts, from the second beam, the beam emitted from the second light source section.

* * * * *